Dec. 7, 1926.

R. R. BURCH 1,610,198

PIPE FINISHING MECHANISM

Filed August 12, 1922    5 Sheets-Sheet 3

Witnesses:
W. F. Kilroy
Harry R. L. White

Inventor:
Robert R. Burch
By Niel & Niel
Attys.

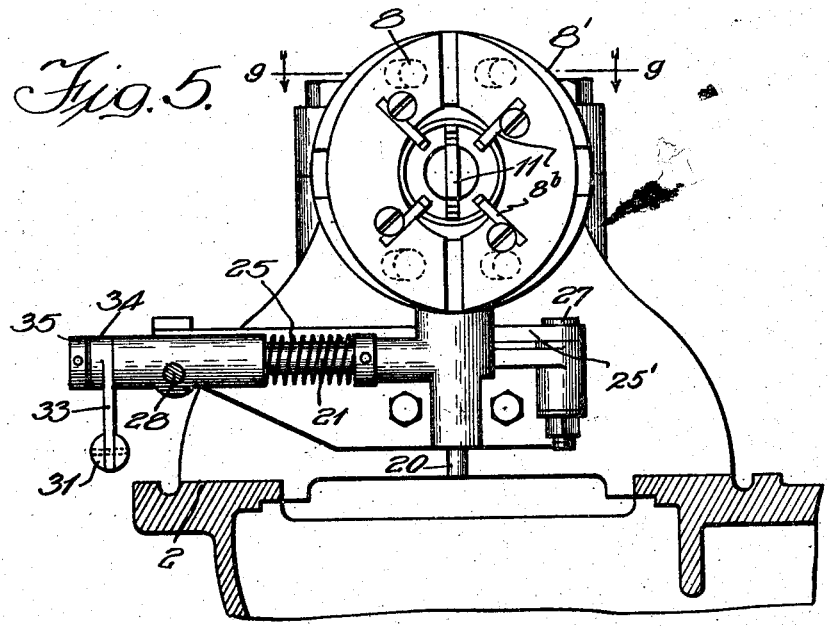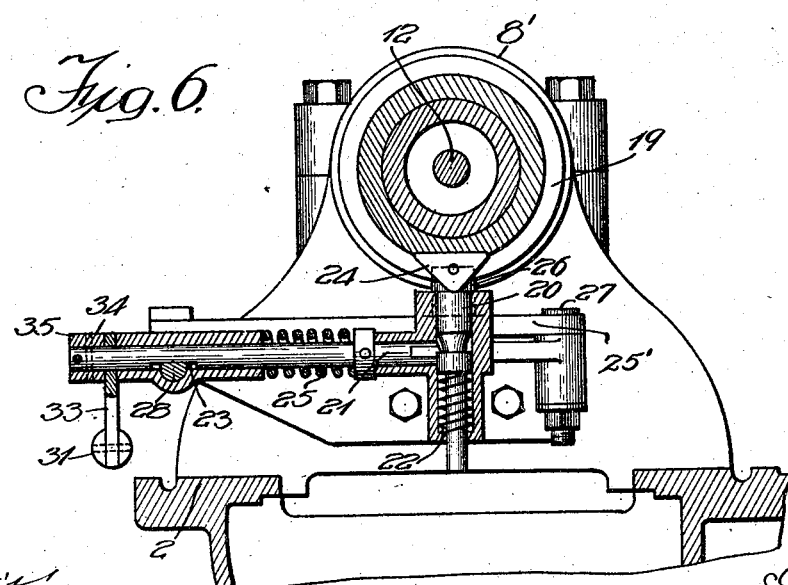

Dec. 7, 1926.

R. R. BURCH 1,610,198

PIPE FINISHING MECHANISM

Filed August 12, 1922    5 Sheets-Sheet 5

Witnesses:
William P. Kilroy
Harry B. White

Inventor:
Robert R. Burch
By
Attys

Patented Dec. 7, 1926.

1,610,198

UNITED STATES PATENT OFFICE.

ROBERT R. BURCH, OF CHICAGO, ILLINOIS, ASSIGNOR TO CHICAGO NIPPLE MANUFACTURING CO., OF CHICAGO, ILLINOIS, A CORPORATION OF DELAWARE.

PIPE-FINISHING MECHANISM.

Application filed August 12, 1922. Serial No. 581,432.

My invention relates to improvements in a pipe feeding mechanism, and more particularly to a machine for finishing pipe nipples, one of the objects of my invention being to thread, ream and chamfer the nipples in unison.

Another object of my invention is to release said pipe finishing means from operative engagement with the nipple automatically at a predetermined point.

The invention has among its other objects the production of a mechanism of the kind described which is simple, durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a top plan view of my device, a portion thereof being broken away;

Fig. 5 is a section taken substantially on the line 5—5 of Fig. 2;

Fig. 6 is a section taken substantially on the line 6—6 of Fig. 2;

Fig. 7 is a section of a pipe nipple unfinished;

Fig. 8 is a section of the same after it has been finished;

Figure 1:
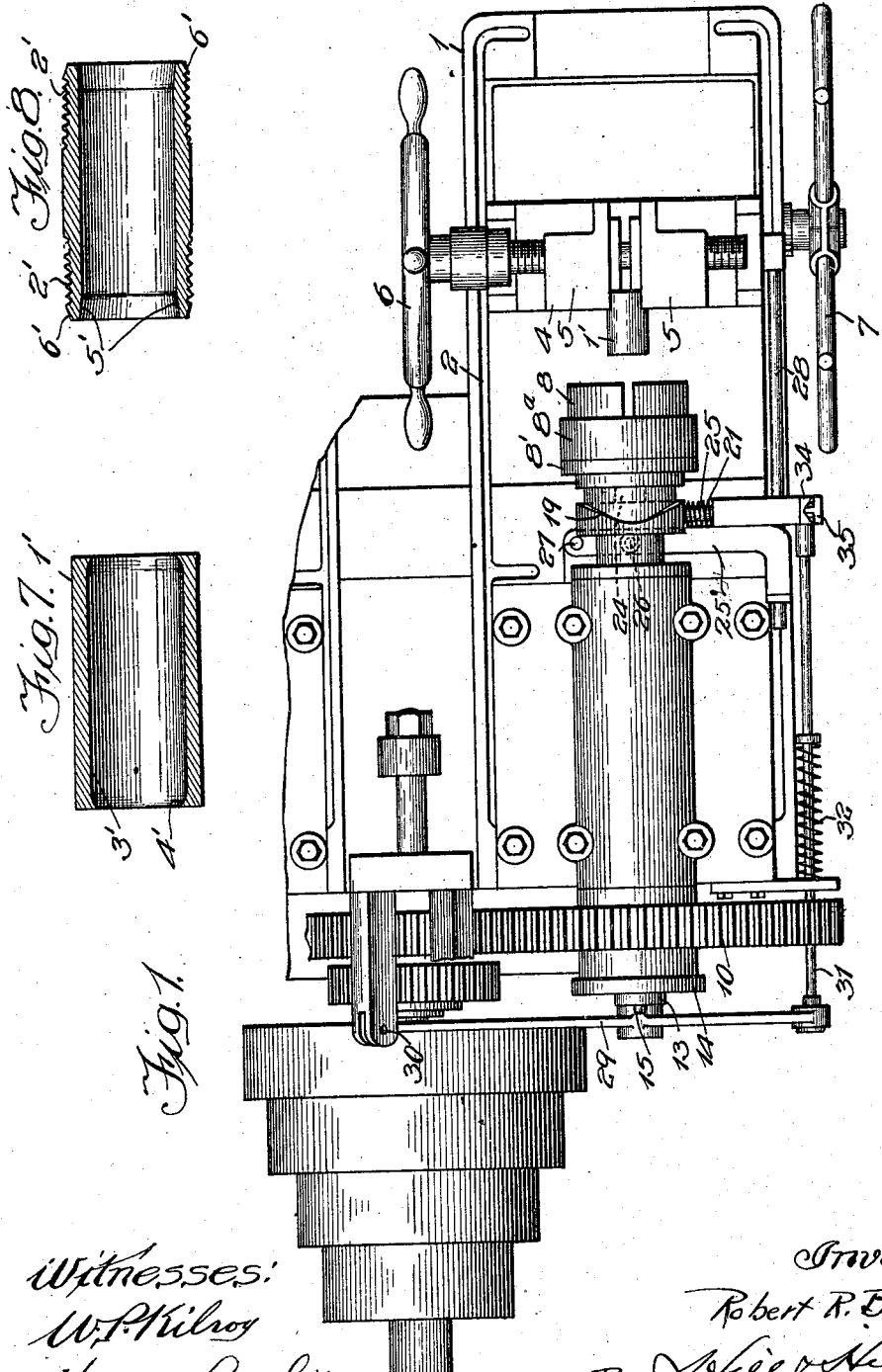

In the drawings, wherein I have illustrated the preferred embodiment of my invention, there is shown a double acting machine, one part of which is completely shown and but a fragment of the other shown, but as the parts are similar it will be necessary to describe only one of the duplex parts of it wherein 1' indicates a length of a pipe to be formed into a nipple, preferably threaded at both ends thereof, as at 2', and having a bore 3' therethrough. These short lengths of pipe as they are cut from the stock are generally found to have burrs 4' at the cut ends, and it is necessary to remove these burrs by reaming or the like, to make the interior of the pipe unobstructed, as shown at 5'. In order that the nipples may be connected up to pipe sections or couplings more easily, they must also be chamfered at their outer ends, as at 6'.

It has heretofore been the usual practice to do the several operations of finishing the nipple, that is, the reaming, threading, and chamfering, either singly or by combining two of the operations at one time, but in my improved mechanism all three of the operations are automatically performed in unison.

Figure 2:
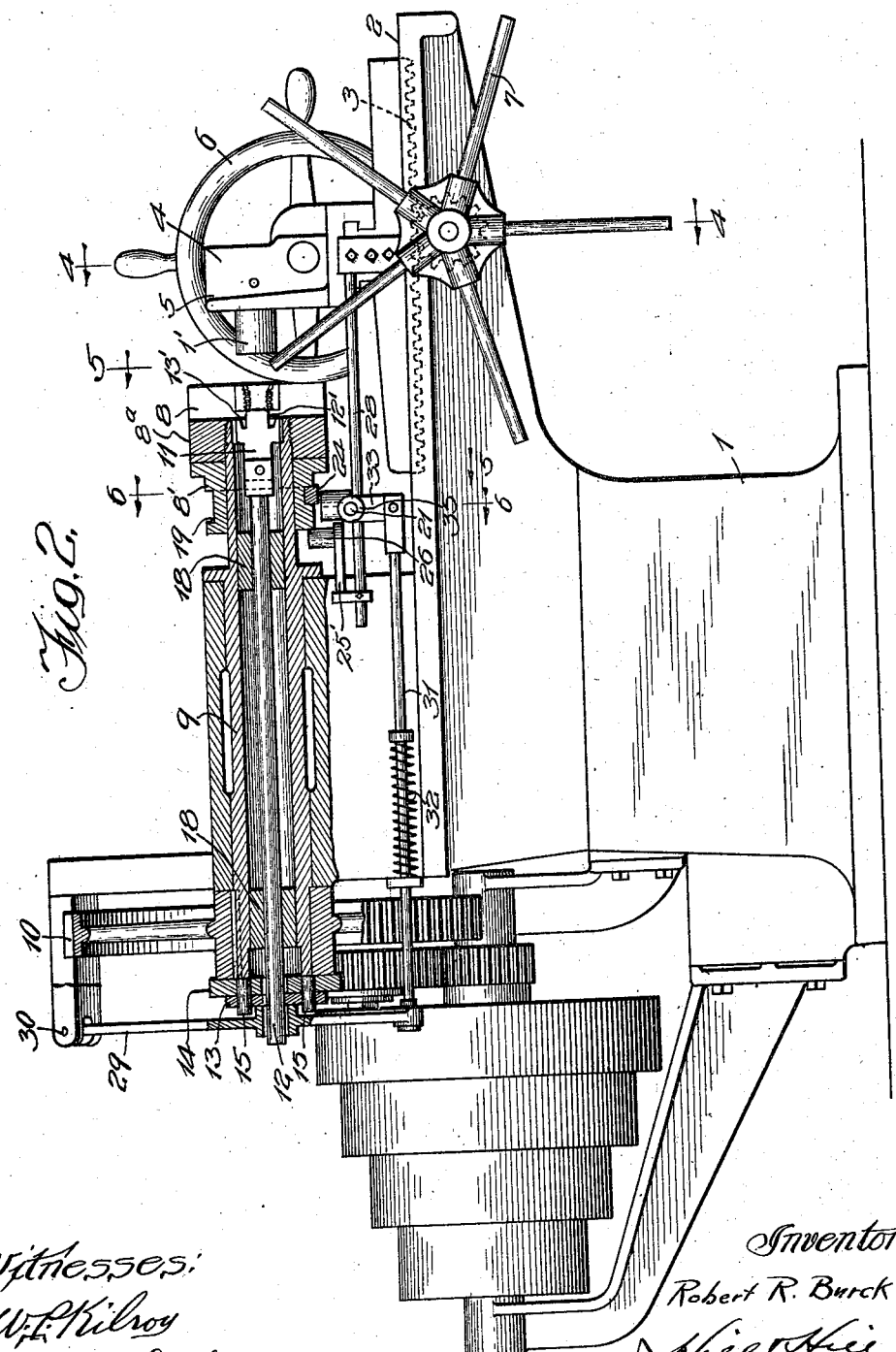
Fig. 2 is a view of the same, partly in section and partly in elevation.
Figure 4:
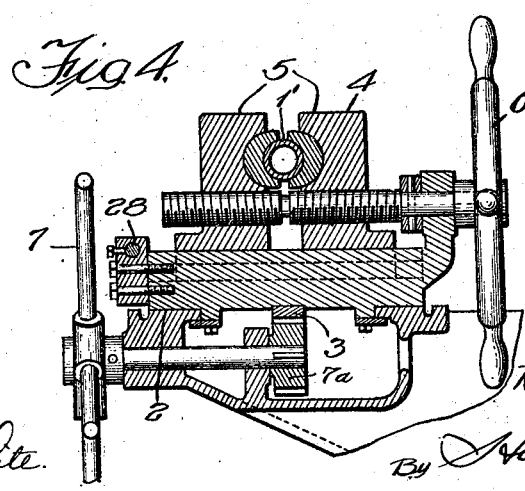
Fig. 4 is a section taken substantially on the line 4—4 of Fig. 2.
Figure 9:
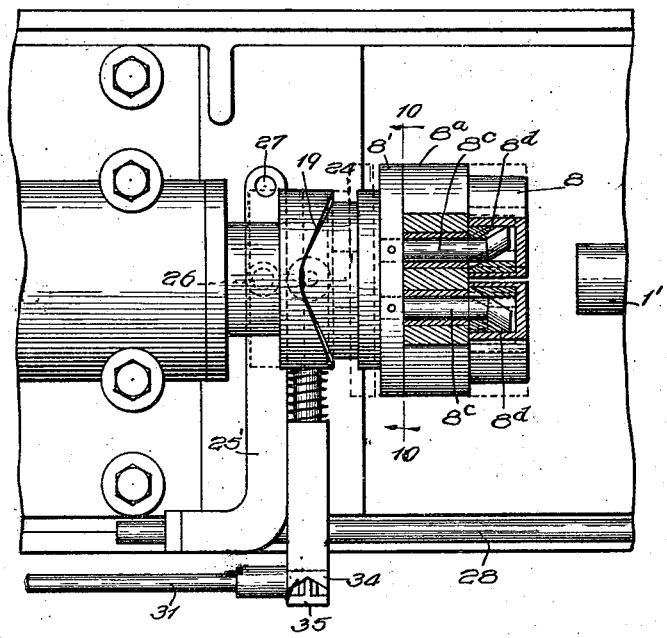
Fig. 9 is a section taken on line 9—9 of Fig. 5.
Figure 10:
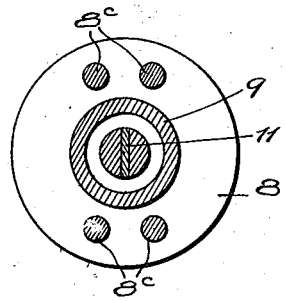
Fig. 10 is a section taken on line 10—10 of Fig. 9.

The mechanism comprises a base part 1 having the customary bed plate 2 in which a pipe-holding device 4 is slidably mounted and the pipe-holding device 4 is provided with rack teeth 3, as shown more clearly in Figs. 1, 2 and 4. The pipe-holding device may be provided with a pair of jaws 5 movable relative to one another to adjustably clamp a length of pipe therebetween, the jaws 5 being adjusted by manipulating the hand wheel 6. After the pipe has been clamped in place, the pipe-holding device may be moved along the bed plate by rotating the hand wheel 7 to feed the pipe to the finishing tools hereinafter described. The hand wheel 7 is constrained to rotate with a pinion 7ª, which meshes with the rack teeth 3.

A pipe threading die is mounted upon the machine so as to be rotatably driven, which threading die comprises a part 8' slidably mounted on a sleeve 9 driven by a gear 10, which is operated by any suitable means. Threaded upon one end of the sleeve 9 is a part 8ª adapted to carry parts 8, which, in turn, carry thread cutting members 8ᵇ, the thread cutting members 8ᵇ being rigidly secured in the parts 8. The parts 8 are slidably mounted upon the part 8ª and are radially movable with respect to the axis of rotation of the part 8ª.

Slidably journaled in the part 8ª and rigidly secured to the part 8' are a plurality of bent posts 8ᶜ, which engage like shaped apertures in the parts 8, the apertures being identified by the reference character 8ᵈ.

A pair of bent posts 8ᶜ are associated with each part 8 and the arrangement is such that if the part 8′ is moved away from the part 8ᵃ the parts 8 will withdraw from each other. In a like manner, if the part 8′ is moved toward the part 8ᵃ, the posts 8ᶜ will cause the parts 8 to move into their functionally operative positions.

A tool 11 preferably of a rectangular cross section and provided with reaming edges 12′ and chamfering edges 13′ is arranged at the rear side of the die to engage the end of a nipple fed thereto, said combined reaming and chamfering tool being preferably removably connected to a part 12 that is rotatably driven in unison with the threading die. The means for drivingly connecting the bar 12 to the driving gear 10 comprises a plate or disk 13 keyed to one end of the bar 12 and mounted adjacent the plate 14 secured to the hub of the gear 10, there being pins 15 projecting from the plate 14 and insertable through openings in the plate 13, so that when the plate 14 is rotated the plate 13 will be driven thereby through the pins 15.

Figure 3:
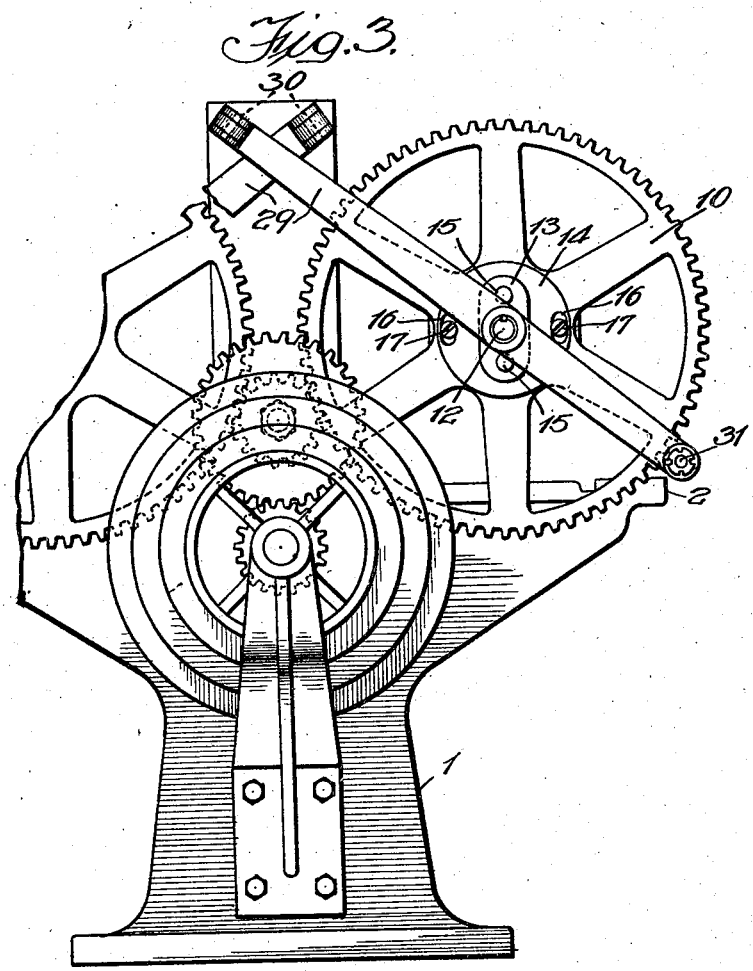
Fig. 3 is an end elevation of the same with a portion thereof broken away.

The plate 14 is connected to the hub of the gear 10 so as to be rotatably adjustable, as shown in Fig. 3. This adjustment is secured by providing arcuate slots 16 in the plate 14 through which are adjustably inserted screws or bolts 17, threaded into the hub of the gear 10. Bushings 18 are provided within the sleeve 9 to form bearings for the bar 12.

As hereinbefore explained the die parts 8 and 8′ are axially separable to cause the die parts 8 to open or close onto the pipe. The die part 8′ is provided with a cam groove 19 adapted to be engaged by a pin 20, which is normally out of engagement with the cam groove (Fig. 6). The pin is radially movable with respect to the cam groove and is normally held in an inoperative position by a spring-pressed rod 21 arranged laterally thereto. A spring 22 tends to press the pin 20 into the cam groove 19. The rod 21 is slidable relative to the pin 20 in a direction transversely thereof so as to release said pin whenever the rod 21 is moved away therefrom, the sliding movement of the rod 21 being limited by a key and key-way 23. It will be seen that as soon as the rod 21 is moved to the left (Fig. 6) the pin 20 will be released from engagement with said rod and will be pressed upwardly by the spring 22 to move into the cam groove 19 to open the die parts 8 and release these die parts from operative engagement with the nipple. A lug or projection 24 arranged at a suitable point in the cam groove 19 is adapted to press the pin 20 downwardly to its inoperative position, as shown in Fig. 6, whereupon the spring-held rod 21 will again latch the pin in its inoperative position.

In order to automatically close the dies to receive a nipple being fed thereto, an arm 25′ (Figs. 1, 2, 5 and 6) carrying a roller 26 to engage against part 8′ of the die having a cam groove 19 therein, is pivoted at 27 to the bed plate, (Fig. 1) said arm 25′ adapted to be actuated at its free end by a rod 28 fastened to the movable pipe holding means 4, as shown more clearly in Figs. 1 and 2.

In order to automatically actuate the pin 20 to open the dies at a predetermined point so as to stop the threading and at the same time stop the reaming and chamfering of the nipple, there is an arm 29 arranged at the outer end of the bar 12 and loosely encircling said bar, but engageable against the plate 13 carried by said bar. This arm 29 is pivoted at one end, as at 30, the other end connected to a rod 31 so that as the arm 29 is actuated about its pivot 30 by the disk 13 carried by the rod 12, it will actuate the rod 31. A spring 32 is interposed between the rod 31 and a stationary part of the mechanism to yieldably resist the movement of the rod 31 and to return said rod to its normal position after such movement. The other end of the rod 31 is connected to a pivoted lever 33, having a cam 34 engageable with a cooperating cam surface 35 at the outer end of the rod 21, so that as the lever 33 is pivoted the cam surfaces 34 and 35 will cooperate to move the rod 21 to release the cam member 20.

It is believed that the operation of the device will be clear from the disclosures just given, this operation being as follows:

The nipple is clamped in place in the member 4 and is fed by hand to the die parts 8, this feeding movement causing the rod 28 to move the arm 25′ to close the dies. As soon as the nipple reaches the closed dies the continued rotation of the dies in engagement with the nipple will automatically feed the nipple thereinto until the inner end of the nipple is engaged by the reaming and chamfering tool; and is completely reamed and chamfered. This tool is slidable axially relative to the die, the sliding movement being resisted by the spring 32. As soon as the nipple has reached a predetermined point, or is finished, the arm 29 is pivoted about the point 30 to pull the rod 31 outwardly, pivot the lever 33 to pull the arm 21 outwardly and release it from its engagement with the pin 20, which thereupon engages in the cam groove 19 to separate the dies from their operative engagement with the nipple.

As soon as the die has rotated through one revolution after its release, the projection 24 engages the pin 20, moving it to its latched normally inoperative position. Thus it is seen that the threading, reaming and chamfering operations are performed in unison and that these operations cease at a predetermined point, to be repeated again as soon as a fresh nipple is fed to the dies.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, pipe feeding means, a rotary threading die radially movable to open or close upon the pipe, a reaming and chamfering tool, a cam operative for controlling said die, a pivoted arm adapted to be actuated by said tool, a rod connected with said arm, a spring engageable with said rod to resist its actuation by said arm, said cam controlled by said rod to open said die at a predetermined point, and means for automatically closing said die when the next pipe to be finished is fed toward said open die.

2. In a device of the kind described and in combination, means for releasably engaging a pipe nipple therein and feeding it, a rotary threading die adapted to close to thread said nipple, a rotary chamfering and reaming tool to engage said nipple, means for operatively connecting said tool and die to simultaneously engage the nipple, means for adjusting said connecting means, a pivoted arm engageable by said tool, spring means for yieldingly resisting the movement of said arm, a cam controlling the opening and closing of said die, a cam member adapted to cooperatively engage said cam and normally out of engagement therewith, means automatically operated by said tool when the nipple is finished to release said cam member to engage said cam and open said die, an arm engageable with said cam, and means operated by the feeding movement of the feeding means for moving said arm to close said die.

3. In a device of the kind described and in combination, pipe feeding means, a rotary threading die radially movable to open or close upon a pipe, a reaming and chamfering tool, a cam operable by the movement of said tool for controlling the releasing of said die from said pipe, and means controlled by said pipe feeding means for closing said die.

4. In a device of the kind described and in combination, pipe feeding means, a threading die, a reaming and chamfering tool, a cam on said die and controlling the operation thereof, an arm adapted to be actuated by said tool, a rod operated through said tool and controlling said cam to open said die at a predetermined point, and means controlled by said pipe feeding means for automatically closing said die.

5. In a device of the kind described and in combination, pipe feeding means, a rotary threading die movable to open or close upon said pipe, a reaming and chamfering tool, a cam operative for controlling said die, an arm operated by said tool, a rod connected with said cam to open said die at a predetermined point, and means operated by said pipe feeding means when the next pipe to be finished is fed toward said open die, for automatically closing said die.

6. In a device of the kind described and in combination, means for releasably engaging a pipe nipple therein and feeding it, a threading die adapted to close to thread said nipple, a chamfering and reaming tool adapted to engage said nipple, means for operatively connecting said tool and die to simultaneously engage said nipple, a pivoted arm operable by said tool, spring means for yieldably resisting the movement of said arm, a cam controlling the opening of said die, a cam member cooperatively engaging said cam, means for normally holding said cam member out of engagement with said cam, means automatically operated by said tool when the nipple is finished to release said cam holding means, an arm engageable with said die, and means operated by the feeding movement of said feeding means for moving said arm to close said die.

In testimony whereof, I have hereunto signed my name.

ROBERT R. BURCH.